(12) United States Patent
Schwartz et al.

(10) Patent No.: US 10,319,237 B1
(45) Date of Patent: Jun. 11, 2019

(54) DYNAMICALLY DETERMINING RUNWAY CONDITIONS

(71) Applicant: The Boeing Company, Chicago, IL (US)

(72) Inventors: Samantha A. Schwartz, Castle Pines, CO (US); Andres C. Fermon, Mexico City (MX); Brian A. Azcuenaga, Centenmal, CO (US); Melissa I. Blackstun, Darmstadt (DE)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/821,526

(22) Filed: Nov. 22, 2017

(51) Int. Cl.
*G08G 5/00* (2006.01)
*H04Q 9/00* (2006.01)
*H04L 29/08* (2006.01)

(52) U.S. Cl.
CPC .............. *G08G 5/0008* (2013.01); *H04Q 9/00* (2013.01); *H04L 67/12* (2013.01); *H04Q 2209/84* (2013.01)

(58) Field of Classification Search
CPC .... G08G 5/0008; H04Q 9/00; H04Q 2209/84; H04L 67/12
See application file for complete search history.

(56) References Cited

U.S. PATENT DOCUMENTS

| 7,586,422 | B2 | 9/2009 | Goodman et al. | |
|---|---|---|---|---|
| 9,434,479 | B2* | 9/2016 | Metzger, Jr. | B60T 8/1703 |
| 9,663,223 | B1 | 5/2017 | Harrison et al. | |
| 2006/0243857 | A1* | 11/2006 | Rado | B60T 8/1703 244/111 |
| 2009/0267798 | A1* | 10/2009 | Goodman | G08G 1/161 340/945 |
| 2016/0196754 | A1* | 7/2016 | Surace | G08G 5/0082 701/117 |

OTHER PUBLICATIONS

U.S. Department of Transportation Federal Aviation Administration Advisory Circular No. 25-31, Dec. 22, 2015, pp. 1-15.

* cited by examiner

*Primary Examiner* — Nader Bolourchi
(74) *Attorney, Agent, or Firm* — Kunzler Bean & Adamson (57) ABSTRACT

An airport computing system is communicatively coupled to a first airplane and to one or more second airplanes over a network system. The airport computing system comprises a plurality of sensors associated with the first airplane. The airport computing system comprises a data module configured to receive data from the first airplane over the network. The data comprises runway data sampled using the plurality of sensors while the first airplane is on a runway. The airport computing system also comprises a parameter module configured to determine one or more parameters that describe a condition for the runway based on the received runway data. The airport computing system further comprises a transmission module configured to transmit the one or more parameters to the one or more second airplanes over the network.

18 Claims, 7 Drawing Sheets

DYNAMICALLY DETERMINING RUNWAY CONDITIONS

FIELD

This disclosure relates generally to airplanes, and more particularly to dynamically determining runway conditions.

BACKGROUND

Runway conditions are generally determined based on the subjective judgment of pilots who operate airplanes on the runways. The pilots' subjective feedback may be used to classify a current condition of a runway. Other pilots may use this information to make decisions for operating airplanes on the runway, such as when landing and taking off. Because the pilots' feedback is subjective, however, the pilots' feedback may be inconsistent and/or not accurate.

SUMMARY

The subject matter of the present application has been developed in response to the present state of the art, and in particular, in response to the problems and disadvantages associated with conventional methods for determining runway conditions. Accordingly, the subject matter of the present application has been developed to dynamically determine runway conditions that overcomes at least some of the above-discussed shortcomings of prior art techniques.

Described herein is an airport computing system that is communicatively coupled to a first airplane and to one or more second airplanes over a network system. The airport computing system comprises a plurality of sensors associated with the first airplane. The airport computing system further comprises a data module configured to receive data from the first airplane over the network. The data comprises runway data sampled using the plurality of sensors while the first airplane is on a runway. The airport computing system also comprises a parameter module configured to determine one or more parameters that describe a condition for the runway based on the received runway data. The airport computing system further comprises a transmission module configured to transmit the one or more parameters to the one or more second airplanes over the network. At least a portion of said modules comprise one or more of hardware circuits, programmable hardware devices, and executable code, the executable code stored on one or more computer readable storage media. The preceding subject matter of this paragraph characterizes example 1 of the present disclosure.

The data module receives a plurality of runway data sets from a plurality of first airplanes. The parameter module determines the one or more parameters based on a combination of each of the plurality of runway data sets. The preceding subject matter of this paragraph characterizes example 2 of the present disclosure, wherein example 2 also includes the subject matter according to example 1, above.

The data module receives new runway data over the network from a different first airplane. The parameter module updates, in real-time, the one or more parameters based on the new runway data. The transmission module transmits the one or more updated parameters to the one or more second airplanes over the network. The preceding subject matter of this paragraph characterizes example 3 of the present disclosure, wherein example 3 also includes the subject matter according to any one of examples 1 or 2, above.

The data module receives the runway data while the first airplane is landing on the runway. The preceding subject matter of this paragraph characterizes example 4 of the present disclosure, wherein example 4 also includes the subject matter according to any one of examples 1-3, above.

The runway data comprises an amount of force applied to the first airplane's brakes over a period of time while the first airplane is landing. The amount of force applied is determined using the plurality of sensors. The preceding subject matter of this paragraph characterizes example 5 of the present disclosure, wherein example 5 also includes the subject matter according to example 4, above.

The one or more parameters that the parameter module determines is an average brake force calculated from the time that the first airplane first applies the brakes until a time when the brakes are not applied while the first airplane is landing. The preceding subject matter of this paragraph characterizes example 6 of the present disclosure, wherein example 6 also includes the subject matter according to example 5, above.

The runway data comprises deceleration data sampled over a period of time while the first airplane is landing, the deceleration data sampled using the plurality of sensors. The preceding subject matter of this paragraph characterizes example 7 of the present disclosure, wherein example 7 also includes the subject matter according to any one of examples 4-6, above.

The one or more parameters that the parameter module determines is a rate of deceleration for the first airplane based on the deceleration data. The preceding subject matter of this paragraph characterizes example 8 of the present disclosure, wherein example 8 also includes the subject matter according to example 7, above.

The one or more parameters that the parameter module determines comprises a coefficient of friction for the runway that is determined based on the runway data. The preceding subject matter of this paragraph characterizes example 9 of the present disclosure, wherein example 9 also includes the subject matter according to any one of examples 1-8, above.

The data module receives the runway data while the first airplane is taking off from the runway. The preceding subject matter of this paragraph characterizes example 10 of the present disclosure, wherein example 10 also includes the subject matter according to any one of examples 1-9, above.

The runway data comprises an amount of thrust applied to the first airplane over a period of time while the first airplane is taking off from the runway. The amount of thrust applied is determined using the plurality of sensors. The preceding subject matter of this paragraph characterizes example 11 of the present disclosure, wherein example 11 also includes the subject matter according to example 10, above.

The one or more parameters that the parameter module determines is an average thrust calculated from the time that thrust is first applied to the first airplane until when the first airplane takes off from the runway. The preceding subject matter of this paragraph characterizes example 12 of the present disclosure, wherein example 12 also includes the subject matter according to example 11, above.

The runway data comprises acceleration data sampled over a period of time while the first airplane is taking off, the acceleration data sampled using the plurality of sensors. The preceding subject matter of this paragraph characterizes example 13 of the present disclosure, wherein example 13 also includes the subject matter according to any one of examples 10-12, above.

The one or more parameters that the parameter module determines is a rate of acceleration for the first airplane based on the acceleration data. The preceding subject matter of this paragraph characterizes example 14 of the present disclosure, wherein example 14 also includes the subject matter according to example 13, above.

Further described herein is an apparatus that comprises a data module configured to receive, at an airport computing system, data from a first airplane over a network. The data comprises runway data sampled using a plurality of sensors located on the first airplane while the first airplane is on a runway. The apparatus also comprises a parameter module configured to determine one or more parameters that describe a condition for the runway based on the received runway data. The apparatus further comprises a transmission module configured to transmit, from the airport computing system, the one or more parameters to one or more second airplanes over the network. At least a portion of said modules comprise one or more of hardware circuits, programmable hardware devices, and executable code, the executable code stored on one or more computer readable storage media. The preceding subject matter of this paragraph characterizes example 15 of the present disclosure.

The data module receives a plurality of runway data sets from a plurality of first airplanes. The parameter module determines the one or more parameters based on a combination of each of the plurality of runway data sets. The preceding subject matter of this paragraph characterizes example 16 of the present disclosure, wherein example 16 also includes the subject matter according to example 15, above.

The data module receives new runway data over the network from a different first airplane. The parameter module updates, in real-time, the one or more parameters based on the new runway data. The transmission module transmits the one or more updated parameters to the one or more second airplanes over the network. The preceding subject matter of this paragraph characterizes example 17 of the present disclosure, wherein example 17 also includes the subject matter according to any one of examples 15 or 16, above.

The data module receives the runway data while the first airplane is landing on the runway. The runway data comprising one or more of an amount of force applied to the first airplane's brakes over a period of time while the first airplane is landing, the parameter module calculating an average brake force based on the amount of force applied to the first airplane's brakes, and deceleration data sampled over a period of time while the first airplane is landing, the parameter module calculating a rate of deceleration for the first airplane based on the deceleration data. The preceding subject matter of this paragraph characterizes example 18 of the present disclosure, wherein example 18 also includes the subject matter according to any one of examples 15-17, above.

The one or more parameters that the parameter module determines comprises a coefficient of friction for the runway. The coefficient of friction is determined based at least in part on one or more of the average brake and the rate of deceleration. The transmission module transmits the determined coefficient of friction to the one or more second airplanes over the network. The preceding subject matter of this paragraph characterizes example 19 of the present disclosure, wherein example 19 also includes the subject matter according to example 18, above.

Additionally described herein is a method that comprises receiving, at an airport computing system, data from a first airplane over a network. The data comprises runway data sampled using a plurality of sensors located on the first airplane while the first airplane is on a runway. The method also comprises determining one or more parameters that describe a condition for the runway based on the received runway data. The method further comprises transmitting, from the airport computing system, the one or more parameters to one or more second airplanes over the network. The preceding subject matter of this paragraph characterizes example 20 of the present disclosure.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
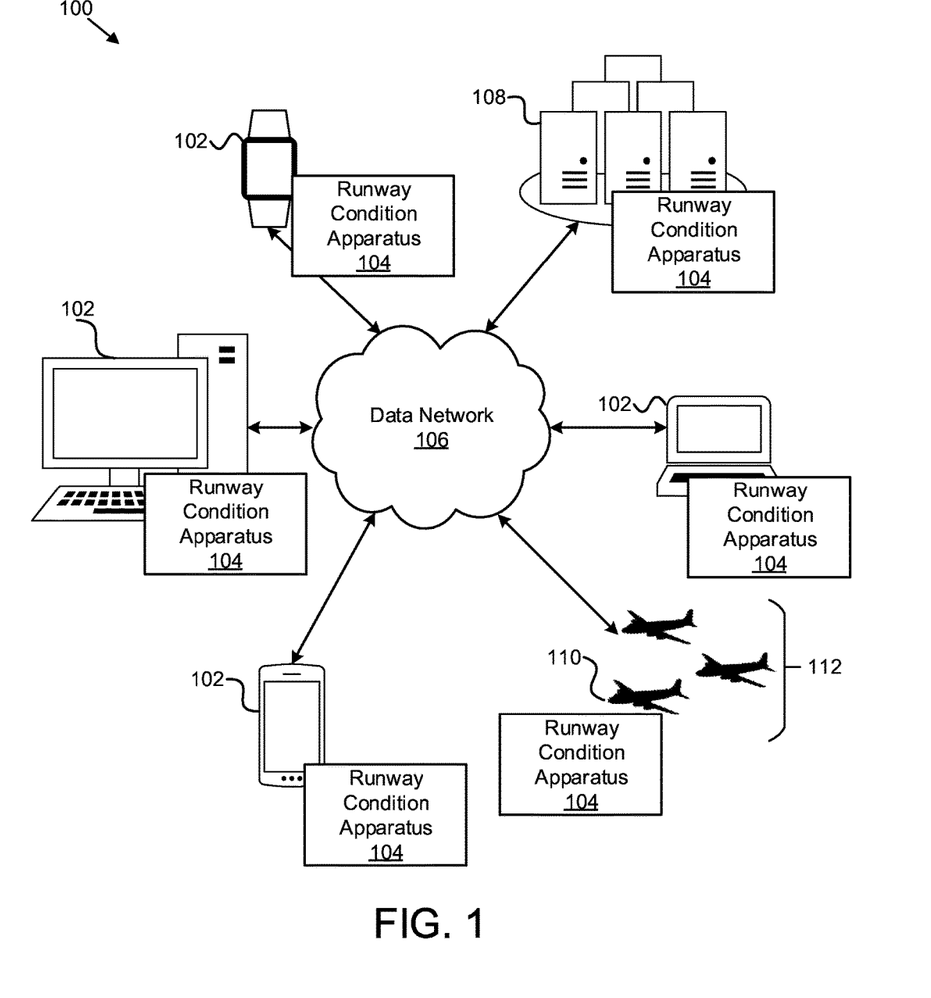
FIG. 1 is a schematic block diagram of a system for dynamically determining runway conditions, according to one or more examples of the present disclosure.

FIG. 1 is a schematic block diagram illustrating one embodiment of a system 100 for dynamically determining runway conditions. The system 100 includes one or more information handling devices 102, one or more runway condition apparatuses 104, one or more data networks 106, one or more servers 108, and one or more airplanes 110. Even though a specific number of information handling devices 102, runway condition apparatuses 104, data networks 106, servers 108, and airplanes 110 are depicted in FIG. 1, one of skill in the art will recognize, in light of this disclosure, that any number of information handling devices 102, runway condition apparatuses 104, data networks 106, servers 108, and airplanes 110 may be included in the system 100.

The information handling devices 102 of the system 100 may include one or more of a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102, one or more servers 108, and/or one or more airplanes 110 over the data network 106, described below. The information handling devices 102 may include processors, processor cores, and/or the like that are configured to execute various programs, program code, applications, instructions, functions, and/or the like.

In one embodiment, the runway condition apparatus 104 is configured to receive, at an airport computing system, runway data from a first airplane over a network. The runway data may be sampled using a plurality of sensors located on the first airplane. The runway condition apparatus 104, in further embodiments, is configured to determine one or more parameters that describe a condition for a runway based on the received runway data. In certain embodiments, the runway condition apparatus 104 is configured to transmit, from the airport computing system, the one or more parameters to one or more second airplanes over the network.

In one embodiment, the runway condition apparatus 104 provides a solution to drawbacks in conventional systems for detecting runway conditions. Runway conditions are conventionally determined based on feedback from pilots or others that use runways. For instance, a pilot may report that the runway is wet, dry, snowy, slushy, windy, and/or the like. However, due to the subjectivity of the feedback, the reported conditions may be inaccurate, not accurate enough, and/or inconsistent.

The runway condition apparatus 104 improves upon conventional methods for determining runway conditions by sampling runway data in real-time using various sensors of an airplane, dynamically determining factors related to the runway conditions, and sharing the determined runway condition factors with other airplanes that are using the runway. Furthermore, the runway condition apparatus 104 continuously updates and shares the determined runway condition factors when new data is received from airplanes that are using the runway. In this manner, a more consistent and accurate determination of runway conditions can be performed and used by pilots to control or adjust the operation of their airplanes.

In various embodiments, the runway condition apparatus 104 may be embodied as a hardware appliance that can be installed or deployed on an information handling device 102, on a server 108, or elsewhere on the data network 106. In certain embodiments, the runway condition apparatus 104 may include a hardware device such as a secure hardware dongle or other hardware appliance device (e.g., a set-top box, a network appliance, or the like) that attaches to a device, a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the runway condition apparatus 104 may include a power interface, a wired and/or wireless network interface, a graphical interface that attaches to a display, and/or a semiconductor integrated circuit device as described below, configured to perform the functions described herein with regard to the runway condition apparatus 104.

The runway condition apparatus 104 may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the runway condition apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the runway condition apparatus 104.

The semiconductor integrated circuit device or other hardware appliance of the runway condition apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the runway condition apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA®"). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. The one or more servers 108 may store data associated with an information handling device 102.

The one or more airplanes 110 may include various airplanes such as commercial airplanes, private airplanes, jets, propeller airplanes, and/or the like. In some embodiments, the airplanes 110 (or aircraft) include multiple sensors for detecting and sampling data about the airplane 110, data about the airplane's external environment, and/or the like. In certain embodiments, the airplane's sensors include sensors for detecting an amount of pressure or force that is applied to the airplane's brakes; sensors for detecting the airplane's acceleration and/or deceleration; sensors for detecting an amount of thrust applied and/or output by the airplane's engines; and/or the like.

In certain embodiments, the airplanes 110 include computing systems onboard that may be communicatively coupled to the sensors, to an airport computing system, and/or computing systems of other airplanes. In this manner, sensor data, for instance, may be transmitted from an airplane to an airport computing system and/or one or more other airplanes over a data network 106 such as a secure wireless communication network. The system 100 may include one airplane 110 or a plurality of airplanes 112, and, in some embodiments, the airplanes 110 may or may not be an affirmative part of the system 100.

Figure 2:
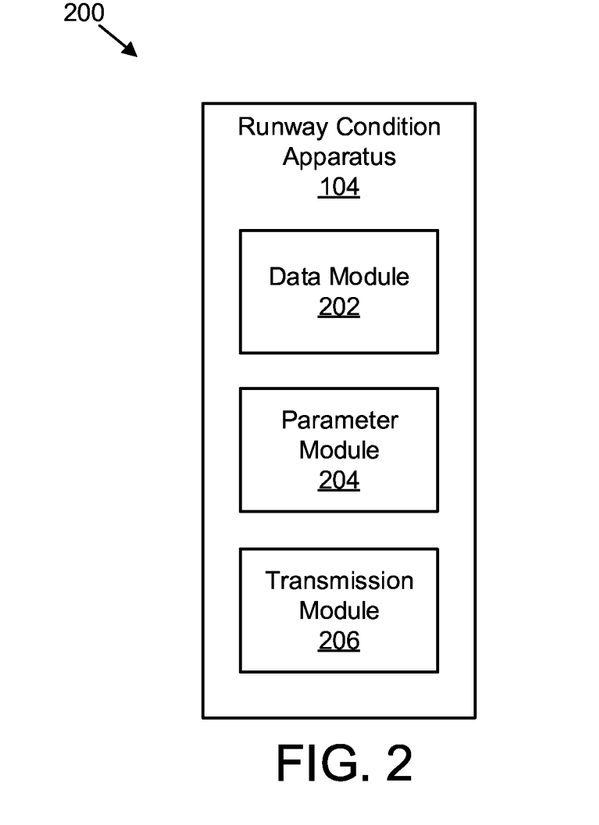
FIG. 2 is a schematic block diagram of an apparatus for dynamically determining runway conditions, according to one or more examples of the present disclosure.

FIG. 2 depicts one embodiment of an apparatus 200 for dynamically determining runway conditions. The apparatus 200 includes an embodiment of the runway condition apparatus 104. The runway condition apparatus 104, in certain implementations, includes one or more of a data module 202, a parameter module 204, and a transmission module 206, which are described in more detail below.

The data module 202, in one embodiment, is configured to receive runway data from an airplane 110, e.g., while the airplane 110 is using the runway to land or take off. In certain embodiments, the runway data is sampled using various sensors integrated with, coupled to, connected to, and/or the like the airplane 110. For instance, the sensors may include sensors for measuring or detecting an amount of force or pressure applied to the airplane's brakes while the airplane 110 is landing. In some embodiments, the sensors include sensors for detecting the acceleration, deceleration, speed, velocity, and/or the like of the airplane 110 while it is landing or taking off. In further embodiments, the sensors include sensors for determining or detecting an amount of thrust, e.g., forward or reverse thrust, applied to the airplane's engines.

In one embodiment, the data module 202 receives runway data from an airplane 110 at an airport computing system over a data network. For example, the data module 202 may receive runway data from the airplane 110 every second, every 500 microseconds or milliseconds, and/or the like while the airplane is in the process of landing and/or taking off from the runway. Thus, the airplane's sensor may begin sensing data that may be used to determine the runway conditions, e.g., the amount of force applied to the airplane's brakes, the airplane's acceleration or deceleration, the amount of thrust provided by the airplane's engines, and/or the like, when the airplane 110 first touches down on the runway when landing or when the airplane 110 begins taking off, and may send the data to the airport computing system over a wireless communication channel between the airplane 110 and the airport computing system throughout the landing and/or taking off process.

In another example, the data module 202 may receive the runway data from the airplane 110 when the airplane 110 has completely finished its landing process, e.g., comes to a stop or is moving below a threshold speed, or takes off from the runway, e.g., when its wheel(s) leave the runway. In one embodiment, the sampled runway data may be normalized, formatted, organized, or otherwise converted to a useable format prior to sending the data to the airport computing system. For instance, the sampled runway data may be aggregated, categorized by data source/sensor, structured using a structured language (e.g., XML), and/or the like prior to the data being sent to the airport computing system.

In one embodiment, the parameter module 204 is configured to determine one or more parameters that describe a condition for the runway based on the received runway data. As used herein, a runway condition parameter may be a variable, factor, coefficient, and/or the like that describes a condition of the runway and/or may be used to determine how to operate one or more aspects of the airplane 110 while landing or raking off from the runway. In such an embodiment, the parameter module 204 may be located on the airport computing system and may calculate, determine, and/or the like the runway condition parameters in response to the data module 202 receiving the runway data at the airport computing system.

In one embodiment, the one or more parameters that the parameter module 204 determines using the runway data includes a coefficient of friction for the runway. The coefficient of friction, as used herein, may describe a ratio between the force necessary to move one surface (e.g., an airplane, or more particularly the tires of the airplane) horizontally over another surface (e.g., the runway surface) and the pressure between the two surfaces.

For instance, the parameter module 204 may use the brake force data (e.g., an average brake force over a period of time while the airplane 110 is landing), the deceleration data (e.g., the rate of deceleration over the period of time while the airplane 110 as landing), and/or the reverse thrust data to calculate the coefficient of friction while the airplane 110 is landing. Similarly, the parameter module 204 may use the acceleration data (e.g., the rate of acceleration of the period of time while the airplane 110 is taking off) and/or the thrust data to calculate the coefficient of friction while the airplane 110 is taking off.

For example, the following calculations may be used to determine the coefficient of friction using the runway data for an airplane 110:

$$f_S = \mu_S f_N$$

$$f_N = f_W - f_L = m_a g - f_L$$

$$V_f^2 = V_i^2 + 2a\Delta x \xrightarrow{yields} a = \frac{V_f^2 - V_i^2}{2\Delta x}$$

$$\sum F = ma = m_a\left(\frac{V_f^2 - V_i^2}{2\Delta x}\right) = f_S + f_D + f_B + f_{RT}$$

$$m_a\left(\frac{V_f^2 - V_i^2}{2\Delta x}\right) = \mu_S(m_a g - f_L) + f_D + f_B + f_{RT} \xrightarrow{yields}$$

$$\mu_S = \frac{m_a\left(\frac{V_f^2 - V_i^2}{2\Delta x}\right) - f_D - f_B - f_{RT}}{(m_a g - f_L)}$$

where $\alpha$=acceleration, $\mu_S$=coefficient of (static) friction, $V_{f,i}$=Velocity final, initial, $\Delta x$=change in position, $m_a$=airplane mass, g=gravity, $f_L$=Lift force, $f_W$=Weight force, $f_D$=Drag force, $f_S$=Force of (static) friction, $f_B$=Braking force, and $f_{RT}$=Reverse thrust force.

In certain embodiments, the drag force may include a positive or negative component due to wind drag. Furthermore, the above calculation assumes no slippage or calculation of kinetic force. In conditions where slippage occurs, only the coefficients of slow moving airplane of the slower part of the airplanes' deceleration are calculated (e.g., areas where no slippage occurs). The airplane's 110 sensors may also be used to determine the airplane's 110 acceleration, and as described above, the airplane's 110 sensors are used to determine the brake force and the amount of reverse thrust applied to the airplane 110 during landing, for example.

In one embodiment, the transmission module 206 transmits the one or more determined parameters to other airplanes 110 that are landing and/or taking off. In certain embodiments, the transmission module 206 transmits the determined parameters to the other airplanes 110 over a data network 106 from the airport computing system, e.g., from the traffic control tower system. In further embodiments, the data module 202 may be located on the airplane 110 that captures the runway data and may receive the runway data from the various sensors, the parameter module 204 may determine the one or more parameters on the airplane 110 that capture the runway data, and may share the determined parameters directly with airplanes landing and/or taking off from the runway, e.g., over a peer-to-peer network, a mesh network, an ad-hoc network, and/or other wireless network.

In certain embodiments, the transmission module 206 and/or the parameter module 204 stores the one or more determined parameters in a remote location, a cloud location, at the airport computing system, and/or the like. In one embodiment, the transmission module 206 accesses the one or more determined parameters from the storage location and sends, transmits, shares, and/or the like the one or more determined parameters to/with airplanes 110 that are landing and/or taking off. In certain embodiments, airplanes 110 that are landing and/or taking off may have direct access to the storage locations for the parameter data, and may access the parameter data from the storage location, e.g., a cloud or other remote location, while bypassing the airport computing system.

In some embodiments, the data module 202 also receives subjective data from pilots operating airplanes 110 on the runway, such as the observed conditions of the runway, e.g., wet, dry, etc., which the parameter module 204 may incorporate into the calculation of the one or more parameters and/or otherwise enhance with the one or more parameters. The transmission module 206 may also transmit the subjective data from the pilots to other pilots that are landing and/or taking off from the runway, in addition to the calculated parameters.

In certain embodiments, the data module 202 receives a plurality of runway data sets from a plurality of airplanes 112 that are landing and/or taking off from the runway. In such an embodiment, the data module 202 or the parameter module 204 may aggregate the various runway data sets, and calculate the runway condition parameters based on the aggregated data set.

In further embodiments, when the data module 202 receives a new runway data set from an airplane 110, after the parameter module 204 has previously calculated the runway condition parameters, the parameter module 204 updates the previously calculated runway condition parameters, in real-time, based on the newly received data. In such an embodiment, the transmission module 206 may transmit the updated runway condition parameters to other airplanes 110 landing or taking off from the runway. In this manner, the runway condition apparatus 104 provides real-time, dynamic, and up-to-date runway condition information to pilots operating airplanes that are using the runway, e.g., to land and/or take off.

Figure 3:
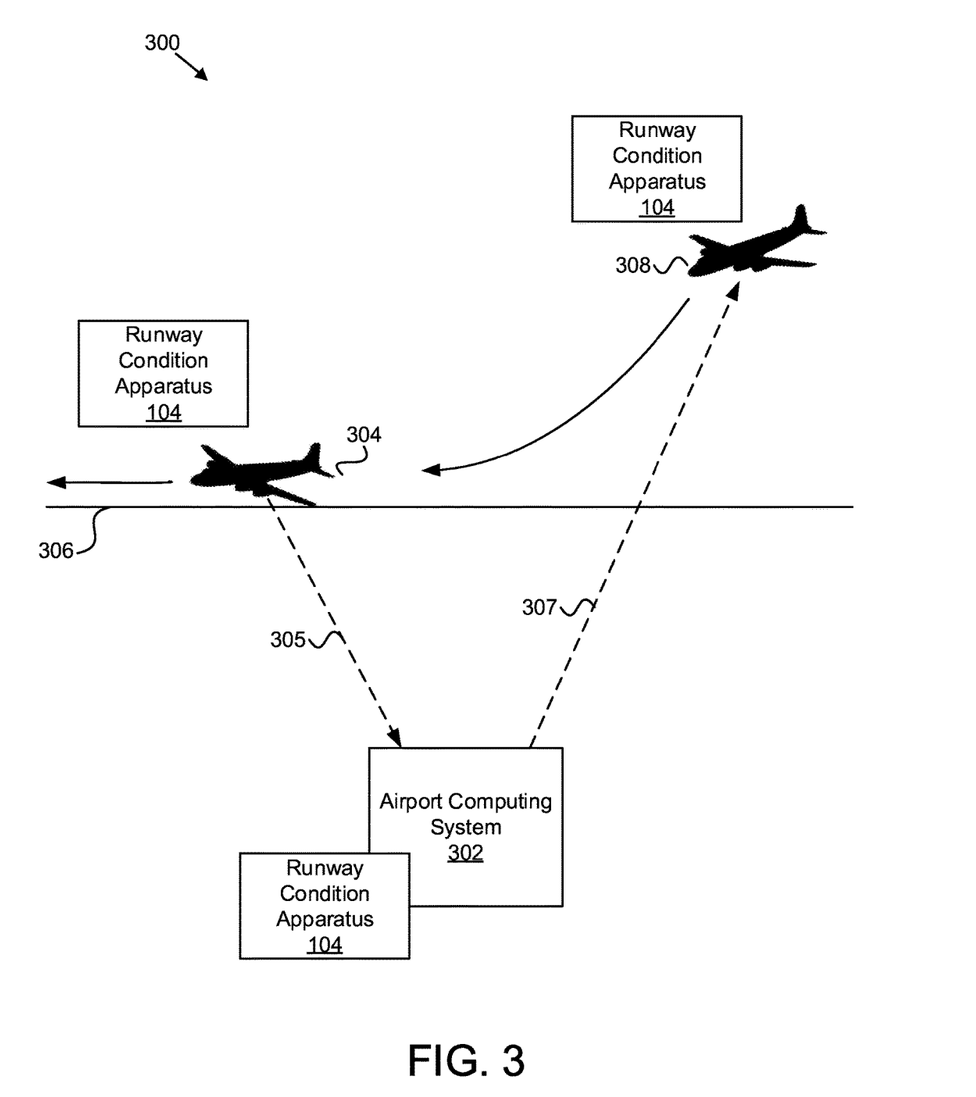
FIG. 3 is a schematic block diagram of a system for dynamically determining runway conditions, according to one or more examples of the present disclosure.

FIG. 3 depicts one embodiment of a system 300 for dynamically determining runway conditions. In one embodiment, the system 300 includes runway condition apparatuses 104, an airport computing system 302, a first airplane 304 that is communicatively coupled to the airport computing system 302 over a first network 305, a runway 306, and a second airplane 308 communicatively coupled to the airport computing system 302 over a second network 307.

In one embodiment, when the first airplane 304 lands on the runway 306, one or more sensors on the first airplane 304 start collecting, sampling, detecting, and/or the like data that may be used to determine conditions for the runway. For example, the sensors may collect braking force data, deceleration data, reverse thrust data, and/or other external environment data such as wind speed on the runway, surface temperature, and/or the like. The first airplane 304 may send the collected data to the airport computing system 302 over the first network 305.

The data module 202 at the airport computing system 302 may receive the sampled data, e.g., on an ongoing basis while the first airplane 304 is landing and/or after the first airplane 304 has completed the landing process. The parameter module 204 at the airport computing system 302 calculates one or more parameters for describing the runway condition, e.g., a coefficient of friction for the runway, which the transmission module 206 at the airport computing system sends to the second airplane 308 over the second network 307. The second airplane 308, and/or the pilot(s) of the second airplane 308, may then use the received data to make adjustments, settings, configurations, decisions, and/or the like regarding factors that are used when landing the airplane 308.

In this manner, other airplanes that are preparing for landing (or take off) can use the received runway condition parameters to more accurately and safely land (or take off) the airplane based on the real-time conditions of the runway. The specific arrangement of devices, e.g., using a central airport computing system 302 that is connected to both the first airplane 304 and one or more second airplanes 308, allows for efficient processing of the sensed runway data and efficient dissemination of the calculated parameters to other airplanes that are preparing to use the runway.

Figure 4:
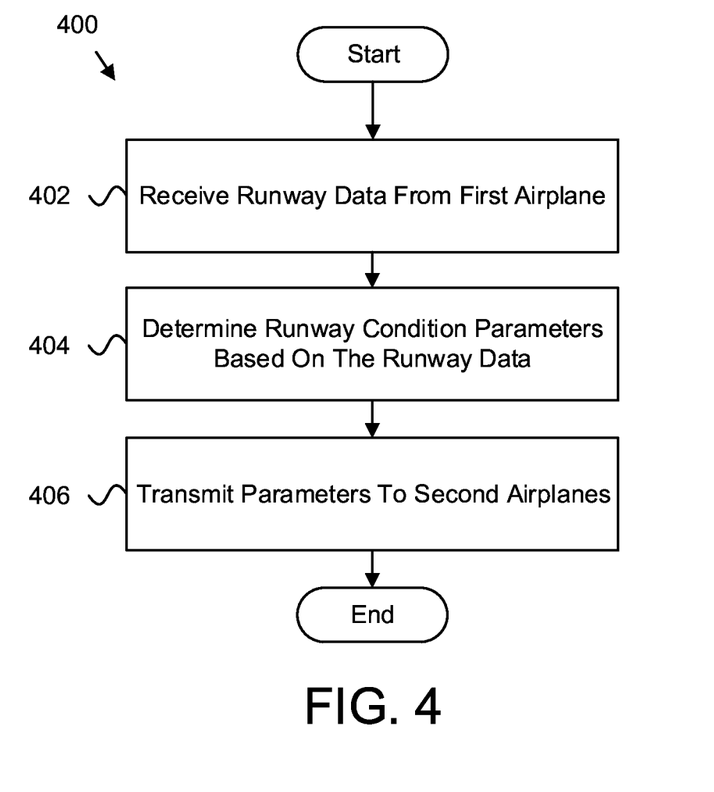
FIG. 4 is a schematic flow diagram of a method for dynamically determining runway conditions, according to one or more examples of the present disclosure.

FIG. 4 is a schematic flow-chart diagram illustrating one embodiment of a method 400 for dynamically determining runway conditions. The method 400 begins, and receives 402, at an airport computing system 302, data from a first airplane 304 over a network 305. In one embodiment, the data includes runway data that is sampled using a plurality of sensors located on the first airplane 304 while the first airplane 304 is on a runway 306.

In certain embodiments, the method 400 determines 404 one or more parameters that describe a condition for the runway 306 based on the received runway data. In some embodiments, the method 400 transmits 406, from the airport computing system 302, the one or more parameters to one or more second airplanes 308 over a second network 307, and the method 400 ends. In certain embodiments, the data module 202, the parameter module 204, and the transmission module 206 perform the various steps of the method 400.

Figure 5:
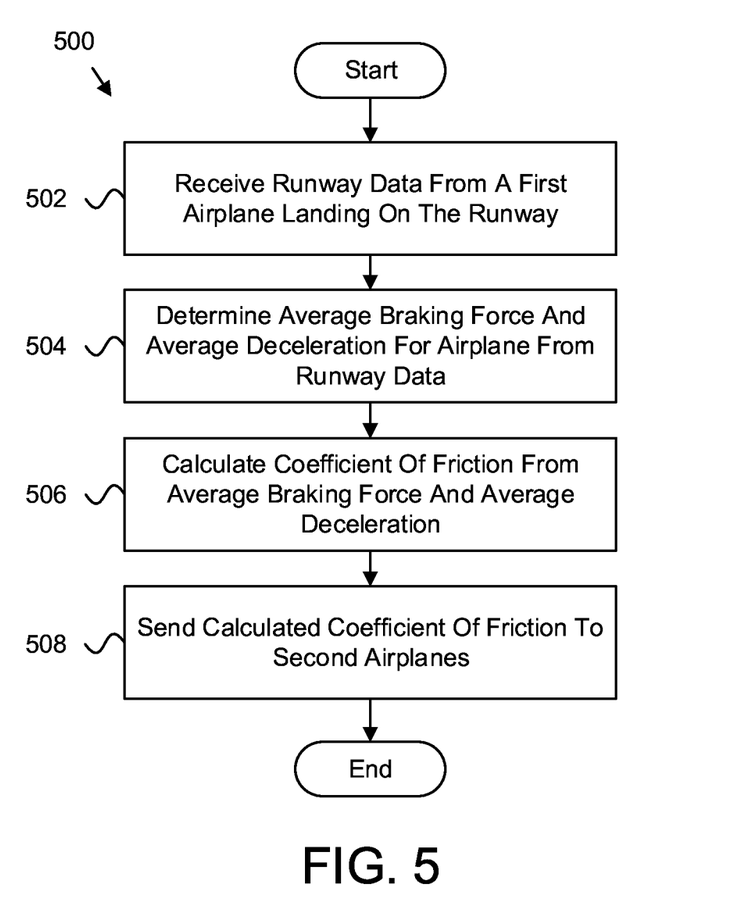
FIG. 5 is a schematic flow diagram of a method for dynamically determining runway conditions, according to one or more examples of the present disclosure.

FIG. 5 is a schematic flow-chart diagram illustrating one embodiment of a method 500 for dynamically determining runway conditions. The method 500 begins and receives 502 runway data from a first airplane 304 landing on a runway 306 over a data network 305. The method 500, in certain embodiments, determines 504 an average braking force and an average deceleration for the first airplane 304 based on the runway data. The method 500, in various embodiments, calculates 506 a coefficient of friction for the runway 306 based on the average braking force and the average deceleration of the first airplane 304 while it is landing. The method 500, in one embodiment, sends 508 the calculated coefficient of friction to one or more second airplanes 308 over a second network 307, and the method 500 ends. In certain embodiments, the data module 202, the parameter module 204, and the transmission module 206 perform the various steps of the method 500.

Figure 6:
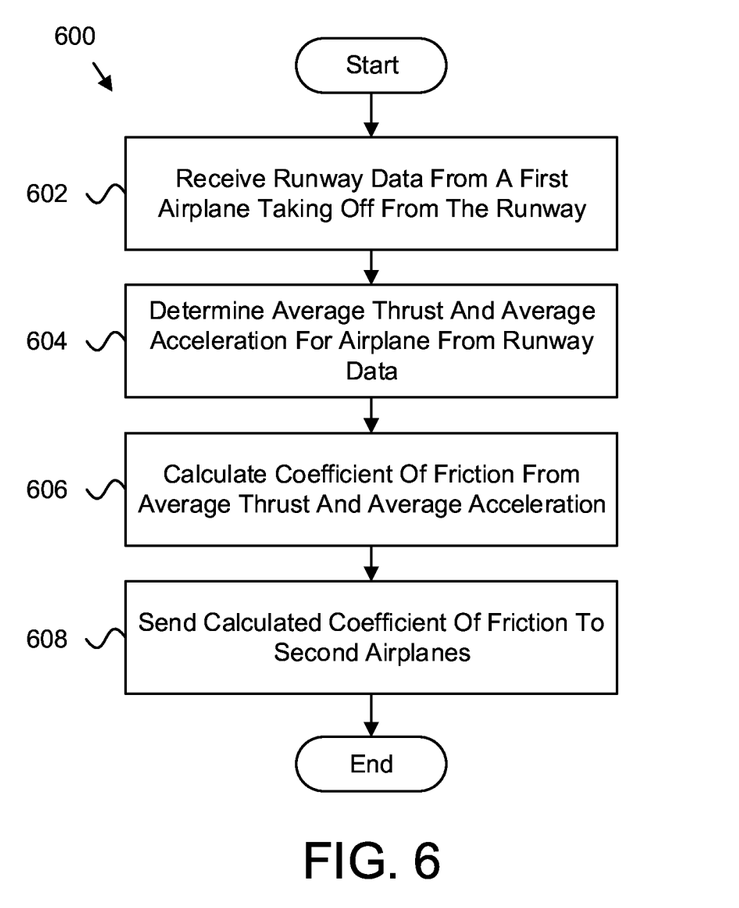
FIG. 6 is a schematic flow diagram of a method for dynamically determining runway conditions, according to one or more examples of the present disclosure.

FIG. 6 is a schematic flow-chart diagram illustrating one embodiment of a method 600 for dynamically determining runway conditions. The method 600 begins and receives 602 runway data from a first airplane 304 taking off from a runway 306 over a data network 305. The method 600, in certain embodiments, determines an average thrust and an average acceleration for the first airplane 304 based on the runway data. The method 600, in various embodiments, calculates 606 a coefficient of friction for the runway 306 based on the average thrust and the average acceleration of the first airplane 304 while it is taking off. The method 600, in one embodiment, sends 608 the calculated coefficient of friction to one or more second airplanes 308 over a network 307n, and the method 600 ends. In certain embodiments, the data module 202, the parameter module 204, and the transmission module 206 perform the various steps of the method 600.

Figure 7:
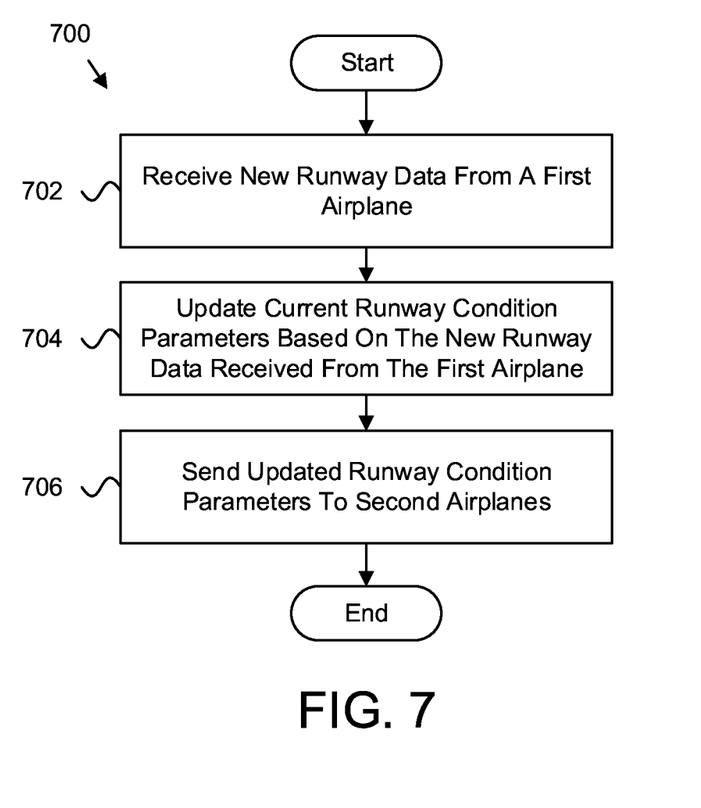
FIG. 7 is a schematic flow diagram of a method for dynamically determining runway conditions, according to one or more examples of the present disclosure.

FIG. 7 is a schematic flow-chart diagram illustrating one embodiment of a method 700 for dynamically determining runway conditions. The method 700 begins and receives 702 new runway data from a first airplane 304 over a data network 305. The method 700, in some embodiments, updates 704 a current or previously calculated runway condition parameter based on the new runway data. The method 700, in various embodiments, sends 706 the updated runway condition parameters to one or more second airplanes 308 over a data network 307, and the method 700 ends. In certain embodiments, the data module 202, the parameter module 204, and the transmission module 206 perform the various steps of the method 700.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method.

Additionally, the order in which a particular method occurs may or may not strictly adhere to the order of the corresponding steps shown.

Embodiments of the various modules may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

The modules may be implemented as a hardware circuit comprising custom very-large-scale integration (VLSI) circuits or gate arrays, off-the-shelf semiconductors such as logic chips, transistors, or other discrete components. The modules may also be implemented in programmable hardware devices such as field programmable gate arrays, programmable array logic, programmable logic devices or the like.

The modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized by the modules. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. An airport computing system communicatively coupled to a first airplane and one or more second airplanes over a network, the airport computing system comprising:
   a plurality of sensors associated with the first airplane;
   a data module configured to:
      receive, at the airport computing system, data from the first airplane over the network, the received data comprising runway data sampled using the plurality of sensors while the first airplane is on a runway; and
      aggregate, at the airport computing system, the received data from the first airplane with a plurality of runway data sets received from a plurality of other airplanes to generate an aggregated runway data set;
   a parameter module configured to determine, at the airport computing system, one or more parameters that describe a condition for the runway based on the aggregated runway data set; and
   a transmission module configured to transmit, from the airport computing system, the one or more parameters to the one or more second airplanes over the network,
   wherein at least a portion of said modules comprise one or more of hardware circuits, programmable hardware devices, and processors.

2. The system of claim 1, wherein:
   the data module receives new runway data over the network from a different first airplane;
   the parameter module updates, in real-time, the one or more parameters based on the new runway data; and
   the transmission module transmits the one or more updated parameters to the one or more second airplanes over the network.

3. The system of claim 1, wherein the data module receives the runway data while the first airplane is landing on the runway.

4. The system of claim 3, wherein the runway data comprises an amount of force applied to brakes of the first airplane over a period of time while the first airplane is landing, the amount of force applied determined using the plurality of sensors.

5. The system of claim 4, wherein the one or more parameters that the parameter module determines is an average brake force calculated from the time that the first airplane first applies the brakes until a time when the brakes are not applied while the first airplane is landing.

6. The system of claim 3, wherein the runway data comprises deceleration data sampled over a period of time while the first airplane is landing, the deceleration data sampled using the plurality of sensors.

7. The system of claim 6, wherein the one or more parameters that the parameter module determines is a rate of deceleration for the first airplane based on the deceleration data.

8. The system of claim 1, wherein the one or more parameters that the parameter module determines comprises a coefficient of friction for the runway that is determined based on the runway data.

9. The system of claim 1, wherein the data module receives the runway data while the first airplane is taking off from the runway.

10. The system of claim 9, wherein the runway data comprises an amount of thrust applied to the first airplane over a period of time while the first airplane is taking off from the runway, the amount of thrust applied determined using the plurality of sensors.

11. The system of claim 10, wherein the one or more parameters that the parameter module determines is an average thrust calculated from the time that thrust is first applied to the first airplane until when the first airplane takes off from the runway.

12. The system of claim 9, wherein the runway data comprises acceleration data sampled over a period of time while the first airplane is taking off, the acceleration data sampled using the plurality of sensors.

13. The system of claim 12, wherein the one or more parameters that the parameter module determines is a rate of acceleration for the first airplane based on the acceleration data.

14. An apparatus comprising:
   a data module configured to:
      receive, at an airport computing system, data from a first airplane over a network, the received data comprising runway data sampled using a plurality of sensors located on the first airplane while the first airplane is on a runway; and
      aggregate, at the airport computing system, the received data from the first airplane with a plurality of runway data sets received from a plurality of other airplanes to generate an aggregated runway data set;
   a parameter module configured to determine, at the airport computing system, one or more parameters that describe a condition for the runway based on the aggregated runway data set; and
   a transmission module configured to transmit, from the airport computing system, the one or more parameters to one or more second airplanes over the network,
   wherein at least a portion of said modules comprise one or more of hardware circuits, programmable hardware devices, and processors.

15. The apparatus of claim 14, wherein:
   the data module receives new runway data over the network from a different first airplane;
   the parameter module updates, in real-time, the one or more parameters based on the new runway data; and
   the transmission module transmits the one or more updated parameters to the one or more second airplanes over the network.

16. The apparatus of claim 14, wherein the data module receives the runway data while the first airplane is landing on the runway, the runway data comprising one or more of:

an amount of force applied to brakes of the first airplane over a period of time while the first airplane is landing, the parameter module calculating an average brake force based on the amount of force applied to the first airplane's brakes; and deceleration data sampled over a period of time while the first airplane is landing, the parameter module calculating a rate of deceleration for the first airplane based on the deceleration data.

17. The apparatus of claim 16, wherein the one or more parameters that the parameter module determines comprises a coefficient of friction for the runway, the coefficient of friction determined based at least in part on one or more of the average brake and the rate of deceleration, the transmission module transmitting the determined coefficient of friction to the one or more second airplanes over the network.

18. A method comprising:

receiving, at an airport computing system, data from a first airplane over a network, the received data comprising runway data sampled using a plurality of sensors located on the first airplane while the first airplane is on a runway;

aggregating, at the airport computing system, the received data from the first airplane with a plurality of runway data sets received from a plurality of other airplanes to generate an aggregated runway data set determining, at the airport computing system, one or more parameters that describe a condition for the runway based on the aggregated runway data set; and transmitting, from the airport computing system, the one or more parameters to one or more second airplanes over the network.

* * * * *